Nov. 28, 1961  D. C. UDY  3,010,614
AUTOMATIC PIPETTE

Filed Dec. 21, 1959  3 Sheets-Sheet 1

INVENTOR.
Doyle C. Udy
BY *Kruhlwell*
Atty.

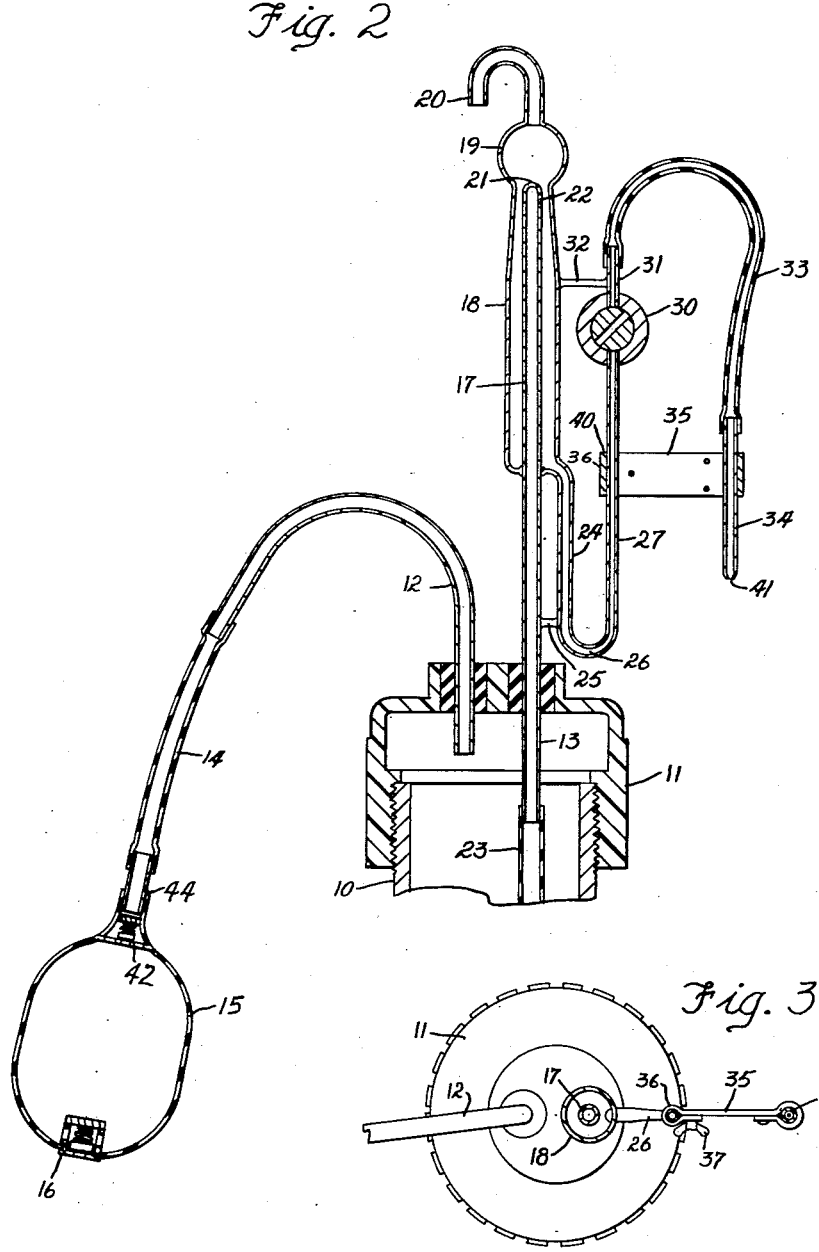

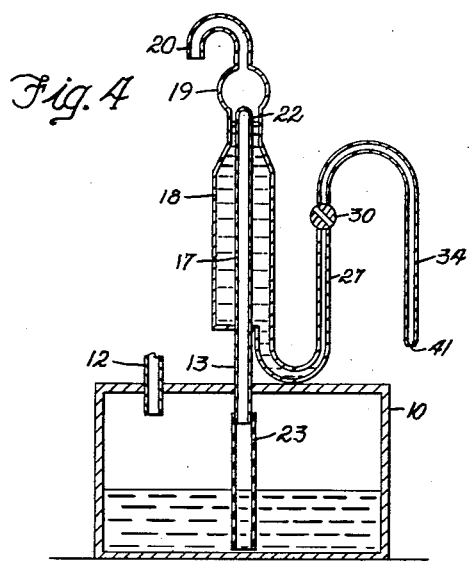
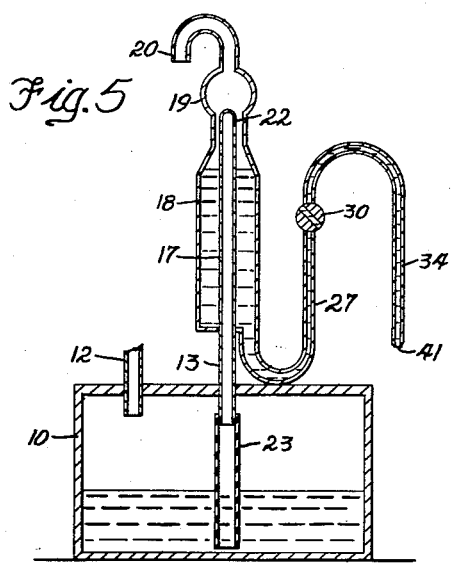
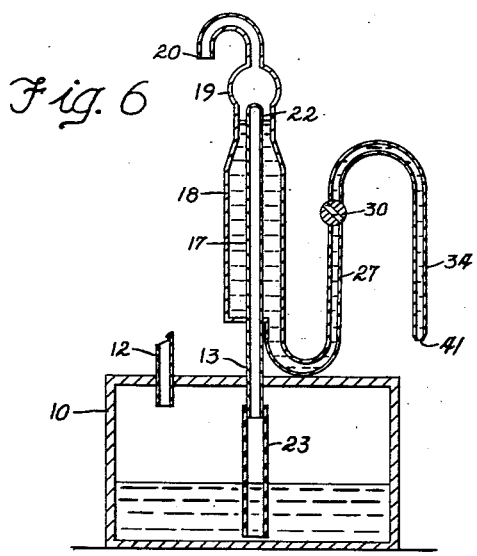
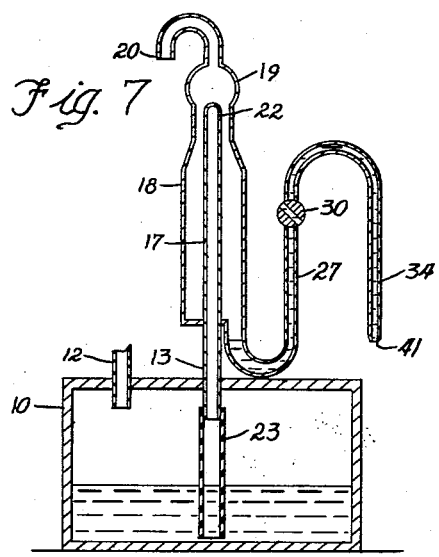

3,010,614
Patented Nov. 28, 1961

3,010,614
AUTOMATIC PIPETTE
Doyle C. Udy, 2205 Orchard Drive, Pullman, Wash.
Filed Dec. 21, 1959, Ser. No. 860,948
2 Claims. (Cl. 222—204)

This invention relates to a novel structure for automatically dispensing a predetermined volume of liquid.

In scientific testing of materials, it is necessary to respect tests using constant standards to insure accurate results. Where liquid reagents are necessary, the measurement of accurate volumes by ordinary sight methods is laborious and time-consuming. Therefore an automatic dispensing device which will insure accurate dispensing of a fixed volume of liquid is both expedient and advantageous in this type of work.

It is an object of this invention to provide an automatic pipette which is simple in construction and which has no mechanical parts which are subject to breakdowns.

It is a further object of this invention to dispense a fixed volume of liquid accurately without physically moving the dispensing apparatus.

It is another object of this invention to provide an accurate system of varying the volume of dispensed liquid by an adjustment made prior to the dispensing of any liquid.

It is another object of the invention to accurately adjust the level in the dispensing apparatus by differential gas pressure with the overflow returning to the supply reservoir.

These and further objects will be obvious from a study of the following disclosure and the accompanying drawings. This disclosure is by way of example, and is not intended to limit the scope of the invention except as it is defined in the annexed claims.

In the drawings:

FIGURE 2 is a cross-sectional view of the automatic pipette shown in FIGURE 1;

FIGURE 3 is a sectional view taken along line 3—3 in FIGURE 1;

FIGURE 4 is a diagrammatic view of the pipette before being primed for use;

FIGURE 5 is a diagrammatic view of the pipette after priming;

FIGURE 6 is a diagrammatic view of the pipette readied for use; and

FIGURE 7 is a diagrammatic view of the pipette after use.

Figure 1:
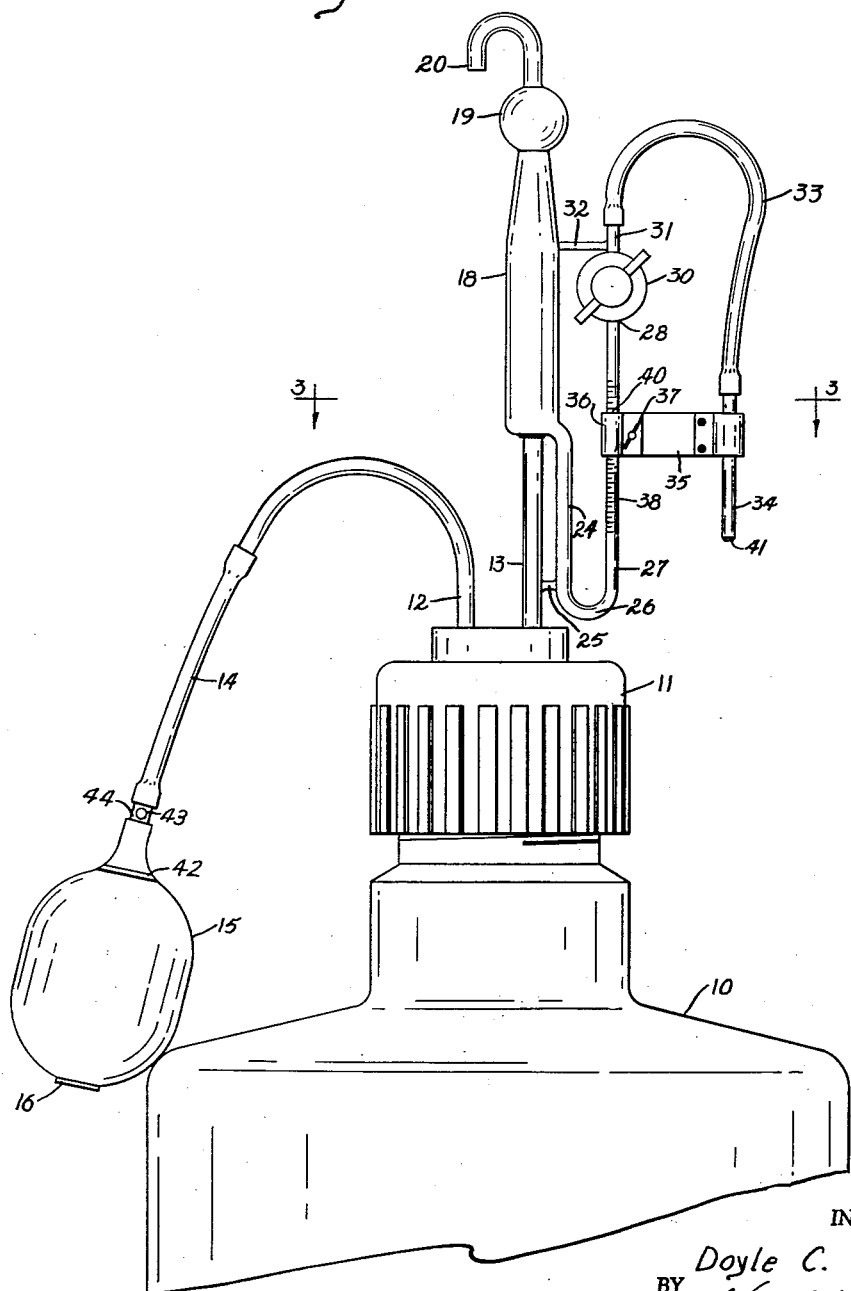
FIGURE 1 is an elevational view of the automatic pipette, with the liquid container being partially broken away.

Referring now to the drawings, the automatic pipette is shown attached to a carboy 10 normally used in the distribution of commercial chemicals. The carboy serves as a reservoir and any enclosed reservoir may be substituted in its place. The carboy screw cap 11 has two sealed apertures which grip an air tube 12 and a supply tube 13.

Air tube 12 is a curved piece of tubing which extends through the screw cap 11 and terminates shortly below the lower surface of the screw cap 11. The remaining end of air tube 12 has connected to it a flexible rubber or plastic hose 14 which connects to the outlet of an aspirator bulb 15. The bulb 15 is of normal construction for hand use, and includes a first valve 16 at one end which allows air to flow into the bulb 15 when the bulb is released. A second valve in bulb 15 is denoted as 42 and acts as a check valve. It allows air to escape into hose 14 when bulb 15 is squeezed. At the same time, of course, valve 16 will be closed, thereby building up pressure in carboy 10. A small hole 43 in a section of tubing 44 leading from bulb 15 to hose 14 is held closed by the user during operation. After the bulb is finally released, hole 43 is uncovered and serves as an exhaust valve to equalize pressure in carboy 10 to atmospheric conditions.

The supply tube 13 is made of straight glass tubing and connects to an inner supply tube 17 which extends vertically above it within a storage chamber 18 made of glass. Chamber 18 is capped by a spherical overflow area 19 which connects to a bent outlet vent 20 that is open at its other end to the atmosphere. The entire assembly 18, 19 and 20 is preferably constructed of glass.

The inner supply tube 17 is closed at its upper end 21 and has an opening 22 along its side near the end 21. Opening 22 is located below the spherical overflow area 19 and within storage chamber 18. The lower end of supply tube 13 is sealed through carboy screw cap 11 and is connected to a flexible hose 23 which extends to the bottom of the carboy 10.

An outlet tube 24 of precision bore tubing, opens to the lower portion of storage chamber 18 and extends vertically parallel to the inlet supply tube 13. It is rigidly braced by a glass rod bridge 25 connected between tube 13 and outlet tube 24. Outlet tube 24 is bent in a U-bend at 26, which terminates in a measuring arm 27 which in turn is provided with graduated markings. Arm 27 is of reduced diameter and extends parallel to the outlet tube 24 and chamber 18. It is connected at 28 to a stopcock 30 which connects to a stopcock arm 31. Stopcock arm 31 is braced by a glass rod bridge 32 fixed between it and the outer wall of the storage chamber 18.

The stopcock arm 31 connects with a flexible tube 33 which in turn is connected to a delivery tip 34. Tip 34 is fixed to an adjustment arm 35 and is positioned parallel to the graduated arm 27. Adjustment arm 35 clamps to graduated arm 27 by means of jaws 36 which are forced inwardly by screw means 37. Measuring arm 27 is graduated as shown at 38 and the elevation of adjustment arm 35 may be located precisely by the upper edge 40 of the jaw 36. The delivery tip 34 has a lower end 41 which is open as a nozzle.

The pipette thus consists essentially of a storage chamber 18 which is adapted to be filled to a fixed maximum level, a precision bored outlet tube 24 and a siphoning structure including the U-bend 26, measuring arm 27, stopcock 30, stopcock arm 31, flexible tube 33 and delivery tip 34.

The operation of this pipette depends on the siphoning action of the arrangement to deliver liquid at end 41 of delivery tip 34. The steps used are diagrammatically illustrated by means of FIGURES 4–7. Before operation, the volume of fluid to be delivered is fixed by adjustment of the adjustment arm 35. The graduations 38 are spaced for the size of the apparatus during its manufacture. The pipette is then primed as shown in FIGURES 4 and 5. Stopcock 30 is closed and the aspirator bulb 15 is pumped by hand. This increases the air pressure in the upper portion of the carboy 10 and forces liquid through hose 23, supply tube 13 and inner supply tube 17 into storage chamber 18 and outlet tube 24. When the level of fluid in storage chamber 18 reaches the lower edge of opening 22, any excess liquid in overflow area 19 will return back through supply tube 13 when bulb 15 is released.

Stopcock 30 is then opened and fluid is allowed to flow through the indexed arm 27, stopcock arm 31, tube 33 and delivery tip 34, where it may be recovered as it flows from the lower end 41. Stopcock 30 is closed when no air remains in the fluid system and it is then primed as seen in FIGURE 5.

By again squeezing bulb 15, the storage chamber 18 is filled to the level of opening 22 as shown in FIGURE 6. The pipette is now ready for use. To deliver the predetermined amount of liquid from end 41 of delivery tip 34 the stopcock 30 is opened, allowing the liquid to freely siphon from the storage chamber 18. This will continue until the liquid level in outlet tube 24 is at the elevation of the end 41 of delivery tip 34. At this point siphoning will end, and the stopcock 30 may be closed. Liquid will remain in delivery tube 34 due to its small diameter. The process may be repeated accurately for as many deliveries as desired by merely filling storage area 18 and opening stopcock 30.

It is therefore evident that a very simple, but efficient and accurate pipette is shown, which may readily be adapted to many situations. It may be manufactured of any materials suitable for the handling of the desired liquid. Since modifications are possible within the scope of the invention, only the following claims are intended as definitions of the extent of the invention.

Having thus described my invention, I claim:

1. An automatic pipette for dispensing liquid from a container comprising:
   storage chamber means;
   liquid supply means operatively connected between said storage chamber means and the container adapted, when energized, to fill the storage chamber means to a maximum level;
   precision bore tubing means opening to the lower portion of said storage chamber means and extending downwardly therefrom;
   siphon means connected at its inlet end to the lowermost end of said precision bore tubing means and having a movable discharge end, said siphon means including a shut off valve adapted to selectively block flow of liquid therethrough;
   and adjustable arm means adapted to fix the position of the discharge end of said siphon means with respect to said storage chamber means, the discharge end of said siphon means being restricted to the elevational limits of said precision bore tubing means.

2. An automatic pipette for accurately dispensing liquid comprising:
   a stationary liquid storage chamber open to the atmosphere and adapted to be filled to a predetermined maximum level;
   a length of precision bore tubing opening to the bottom of said storage chamber and extending downwardly therefrom;
   siphon means connected to the lowermost end of said tubing and including a movable discharge nozzle and a stopcock located intermediate said tubing and the discharge nozzle;
   and adjustable clamp means operatively connected to said movable discharge nozzle adapted to be fixedly secured relative to said tubing, said clamp means being adapted to selectively position the nozzle within the elevational limits of the precision bore tubing.

References Cited in the file of this patent
UNITED STATES PATENTS

| | | |
|---|---|---|
| 1,293,017 | Broche | Feb. 4, 1919 |
| 2,492,944 | Aycock | Jan. 3, 1950 |
| 2,677,480 | Wiczer | May 4, 1954 |